United States Patent Office 2,914,551
Patented Nov. 24, 1959

2,914,551

FLUORESCENT METHINE DYES

Nicholas J. Kartinos, Niles, Ill., and William W. Williams, Zurich, Switzerland, assignors to General Aniline & Film Corporation, New York, N.Y., a corporation of Delaware No Drawing. Application September 5, 1956
Serial No. 607,971

4 Claims. (Cl. 260—465)

This invention relates to the production of novel methine dyes and more particularly to dyestuffs corresponding to the general formula

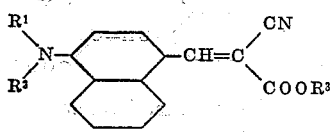

wherein $R^1$ is selected from the group consisting of alkyl, cycloalkyl and aryl; $R^2$ is alkyl and, when taken together with $R^1$, part of a heterocycle; and $R^3$ is an alkyl radical.

The above-defined dyestuffs of the instant invention have been found to exhibit intense daylight as well as ultraviolet fluorescence and are bright yellow to red-orange in shade. They are useful for coloring by incorporation into various resin coatings and lacquers such as nitrocellulose, vinyl, beetle coatings, and the like. In addition, they may also be employed for the spin dyeing of synthetic films and fibers, for example, acetate rayon and viscose, by inclusion in the spinning solutions from which such films and fibers are produced. In view of their fluorescent properties, other uses will become obvious to persons skilled in the art.

The above-defined dyestuffs of the instant invention may be prepared in the known manner of producing methine dyestuffs by reaction of a 4-N,N-disubstituted-aminonaphthaldehyde-1 with a cyanoacetic acid alkyl ester. In carrying out this reaction, it is preferred to heat the reactants in the presence of a catalyst and an inert liquid diluent. The preferred diluent is ethanol, but other diluents may be employed, as for example, methanol, isopropanol, acetone, benzene, toluene, cyclohexanol, cyclohexanone, pyridine, morpholine, dimethylaniline, dibutyl ether, and the like. The condensation is preferably carried out by simply heating the mixture, as by refluxing, for a suitable period of time until the condensation is completed. In general, the reaction may be carried out at room temperature up to 120° C. or more. In some instances, the diluent, when used, may serve also as a catalyst for the condensation involved. While an excess of one of the reactants may in some instances be desirable, it is in general preferred to employ equimolar amounts to avoid the necessity of removing the excess unreacted material.

As the catalyst to be employed in the process of this invention, piperidine is preferred because of its superiority with respect to increasing the speed of the reaction and other catalytic properties. Other catalysts, however, may be used, as for example, diethylamine, alkali metals, alkali metal alcoholates, carbonates, and acetates, pyridine and the like. The amount of catalyst to be employed should be sufficient to effect complete condensation between the reactants involved. In general, about 2–5% of the catalyst by weight of the 4-N,N-disubstituted-aminophthaldehyde-1 is adequate to produce the desired results, although amounts varying therefrom may in some instances be operative.

As the naphthaldehyde reactant, there may be mentioned by way of example 4-N,N-dimethyl-, -N,N-dipropyl-, -N-methyl-N-ethyl-, -N,N-dibutyl-, -N-methyl-N-cetyl-, -N-methyl-N-stearyl-, -N,N-dilauryl-, -N-methyl-N-benzyl-, -N-ethyl-N-cyclohexyl-, -N-propyl-N-phenyl-, piperidyl-, -pyridyl-, -morpholinyl - aminonaphthaldehyde-1, and the like. These reactants may be readily prepared by the Vilsmeier procedure (Ber., 60, 119–122) or by its modification disclosed in British Patent No. 607,920 involving substitution of N,N-dimethyl formamide for the N-methyl formanilide, and German Patent No. 501,108. The 4-N,N-lower dialkylaminonaphthaldehyde-1 compounds are preferred.

As the cyanoacetic acid alkyl ester, there may be mentioned the methyl, ethyl, propyl, isopropyl, butyl, isobutyl, hexyl, lauryl, cetyl, and stearyl esters. The lower alkyl esters are preferred. These esters are well known in the prior art and may be produced in well-known manner. It will be understood that radicals in the $R^1$, $R^2$, and $R^3$ groups above defined in the product of the instant invention, and in the reactants employed in producing same may contain inert substituents which do not interfere with the desired reaction. For example, the $R^3$ alkyl may contain a cyano, chloro, hydroxy, alkoxy such as ethoxy, or hydroxypolyalkoxy such as hydroxypolyethoxy, radical or the like, which may be subsequently modified. Thus, hydroxy groups in the $R^3$ radical may be esterified.

As has been stated above, the preferred method of carrying out the condensation is in the presence of an inert liquid diluent. However, in some instances, it is feasible to carry out the condensation in the absence of a diluent by heating the mixture of reactants and catalyst at a temperature sufficient to maintain the reaction mass in a liquid condition until the condensation is completed. This manner of operation has certain operational and economical advantages including elimination of certain purification steps, use of smaller size equipment, reduction of certain fire and health hazards involved in the use of liquid diluents and the like.

The subject dyestuffs produced in accordance with this invention are soluble in a variety of organic solvents, which property, in addition to their fluorescence and bright yellow to red-orange shades, render them highly advantageous for use in coloring various media for decorative effects, for the conveyance of intelligence, and the like.

The following examples, in which parts are by weight unless otherwise indicated, are illustrative of the instant invention and are not to be regarded as limitative:

Example 1

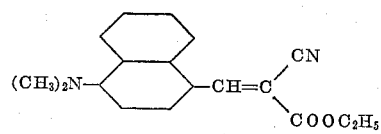

10 g. (0.05 mole) p-N,N-dimethylaminonaphthaldehyde-1
6.78 g. (0.06 mole) ethyl cyanoacetate
200 ml. ethanol
10 drops piperdine The above reactants are combined and heated under reflux for several hours. A red-orange color develops. After cooling the precipitated solid product is separated and dried. The yield of fluorescent red-orange solid is 14.7 g. M.P. 214–215.5° (100% of the theoretical amount).

Example 2

The procedure of Example 1 is repeated, but using as reactants 14.15 g. 4-N,N-dibutylaminonaphthaldehyde-1 and 6.78 g. ethyl cyanoacetate. Similar results are obtained, the product having the formula

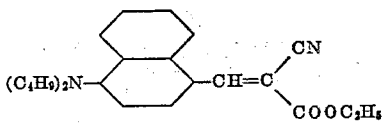

*Example 3*

The procedure of Example 1 is repeated, but using as reactants 14.05 g. 4-N-ethyl-N-cyclohexylaminonaphthaldehyde-1 and 5.95 g. methyl cyanoacetate. Similar results are obtained, the product having the formula

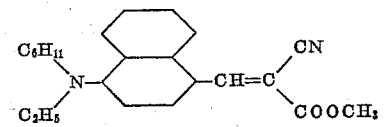

*Example 4*

This example illustrates use of the instant dyestuffs in a coating composition.

100 mg. dyestuff is dissolved in 20 cc. dye solvent and 40 g. nitrocellulose lacquer. This composition is used as a coating agent for coating paper, aluminum foil, etc., forming a red-orange film.

The dye solvent used consists of:
    40.0 parts methanol
    27.0 parts ethanol
    18.0 parts toluene
    15.0 parts ethyl acetate The lacquer composition consists of:
    67.5 parts nitrocellulose solution
    19.0 parts glyptal solution
    7.7 parts dibutyl phthalate
    5.8 parts n-butanol The nitrocellulose solution consists of:
    40.0 parts nitrocellulose
    21.5 parts ethanol
    23.1 parts ethyl acetate
    9.6 parts butyl acetate
    5.8 parts n-butanol The glyptal solution consists of:
    65.0 parts glyptal resin
    35.0 parts xylene This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. Compounds having the formula

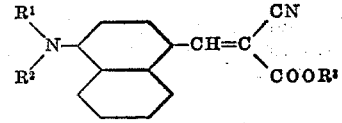

wherein $R^1$ is selected from the group consisting of alkyl, cyclohexyl and phenyl; $R^2$ is alkyl and when taken together with $R^1$, part of a heterocycle; and $R^3$ is an alkyl radical.

2. The compound having the formula

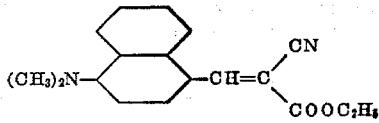

3. The compound having the formula

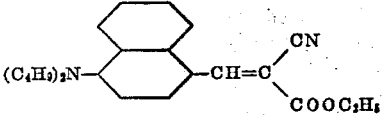

4. The compound having the formula

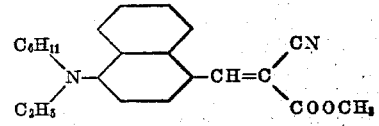

References Cited in the file of this patent

UNITED STATES PATENTS

| | | |
|---|---|---|
| 1,950,421 | Wahl | Mar. 13, 1934 |
| 2,649,471 | Williams et al. | Aug. 18, 1953 |
| 2,803,640 | Heckert | Aug. 20, 1957 |

OTHER REFERENCES

Migrdichian: The Chemistry of Organic Cyanogen Compounds (1947), p. 321.